United States Patent [19]

Jorgensen

[11] 3,737,219

[45] June 5, 1973

[54] FILM EDITING DEVICE

[76] Inventor: Leif G. Jorgensen, 211 South Main Street, Lombard, Ill.

[22] Filed: May 17, 1971

[21] Appl. No.: 143,761

[52] U.S. Cl. .....................352/129, 353/21, 352/182
[51] Int. Cl. .........................G03b 21/00, G03b 29/00
[58] Field of Search .......................352/129; 353/21; 355/64

[56] References Cited

UNITED STATES PATENTS

| | | | |
|---|---|---|---|
| 3,002,703 | 10/1961 | Hinchman | 242/55.12 |
| 2,906,167 | 9/1959 | Castedello | 353/21 |
| 2,292,825 | 8/1942 | Dilks | 355/64 |
| 1,573,825 | 2/1926 | Grunfeld | 352/129 |
| 1,921,469 | 8/1933 | Kuhn | 352/129 |
| 3,459,472 | 8/1969 | Husted | 352/129 |

Primary Examiner—John M. Horan
Attorney—Richard W. Carpenter

[57] ABSTRACT

A device for editing motion picture film which includes a film inspection station having means for viewing, cutting, and splicing film; and a pair of film transporting stations having means for winding the film, means for driving the winding means, braking means, and clutch means for controlling the driving and braking means to prevent accidental breaking of film and also to eliminate excess slack between the winding means.

12 Claims, 5 Drawing Figures

PATENTED JUN 5 1973
3,737,219
SHEET 1 OF 2
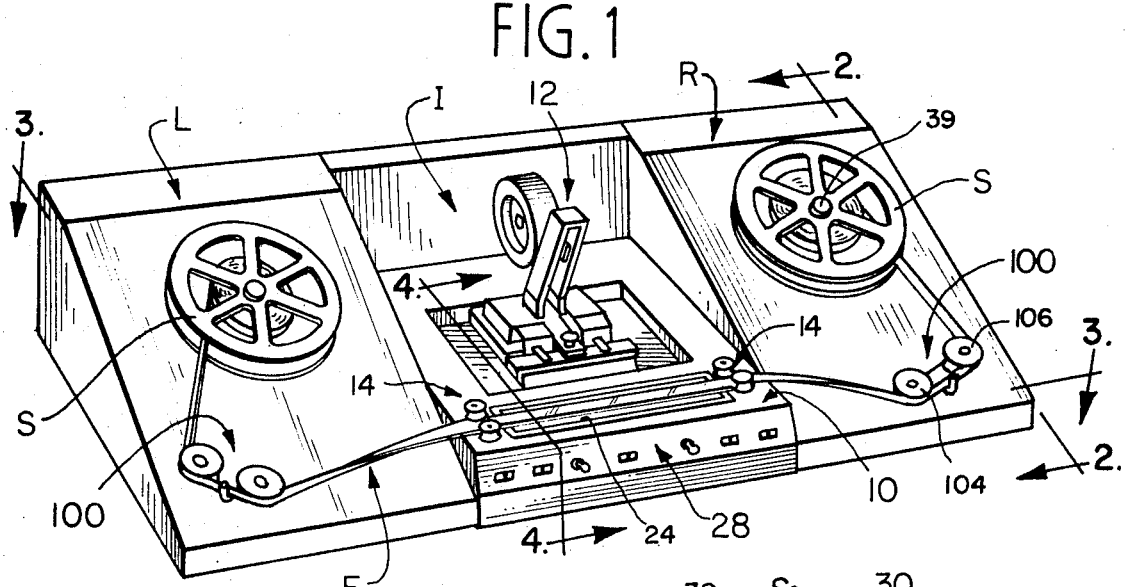
FIG. 1
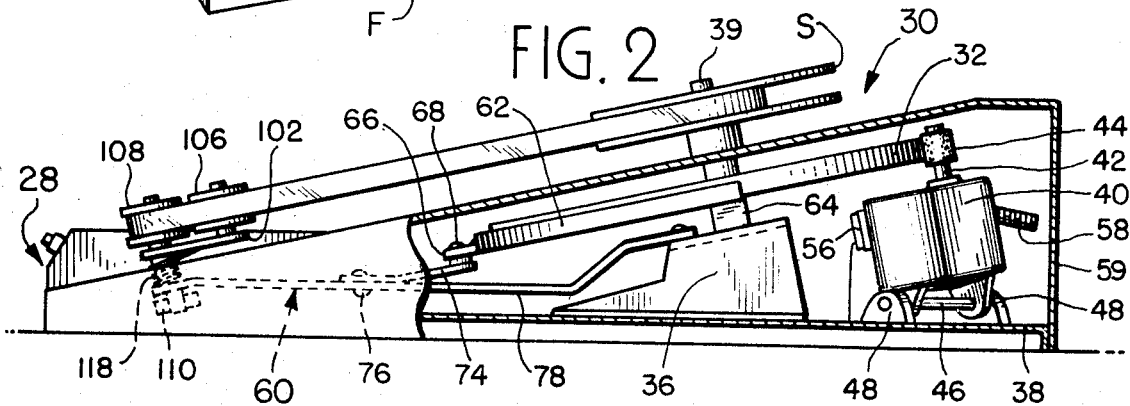
FIG. 2
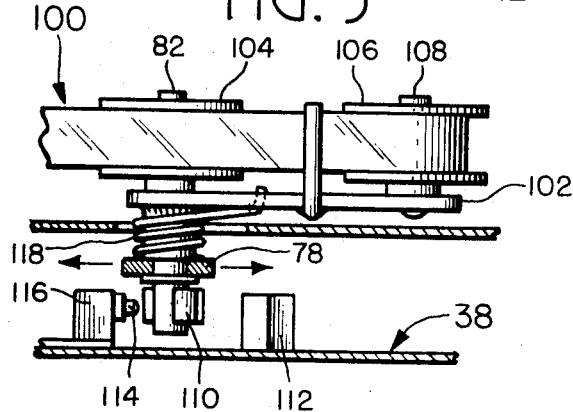
FIG. 5
FIG. 4
Inventor
Leif G. Jorgensen
By Richard W. Carpenter
Attorney

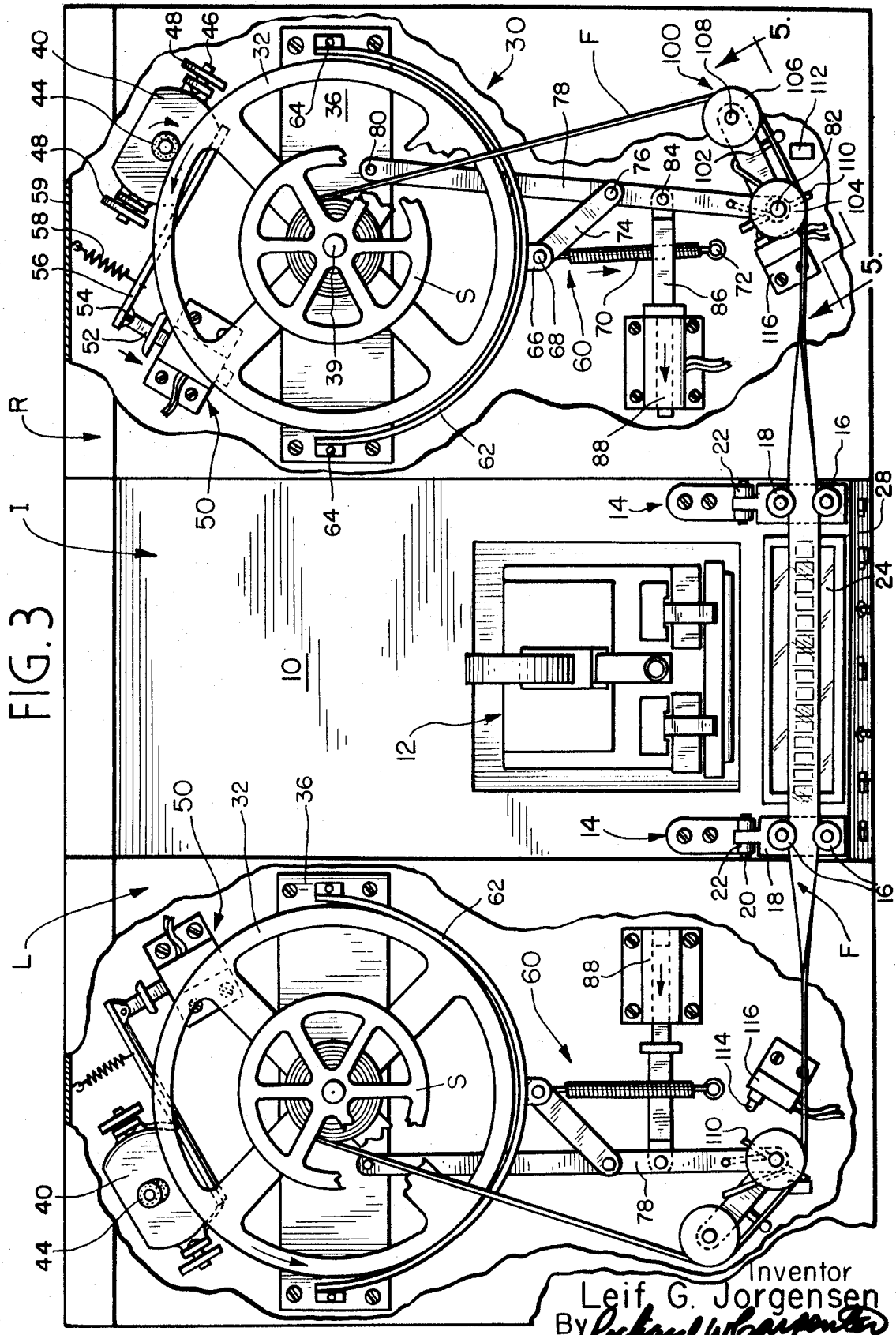

FILM EDITING DEVICE

One of the problems related to apparatus used in the editing of motion picture film is that of controlling the travel of the film across the inspection station in such a way that it can be moved slowly, as well as rapidly, so the travel can be started or stopped quickly without breaking the film or unwinding film from one reel when the slack is not being taken up at the same time on the other reel.

It is therefore a primary object of this invention to provide, in a film editing device of the type described, an improved film driving mechanism and clutch mechanism therefor which will permit high speed travel of the film and abrupt stopping without unwanted slack or accidental breaking of the film.

A more specific object of the invention is to provide cooperating brake and clutch mechanisms that will control the slack on acceleration and deceleration of film travel to accomplish this purpose.

These and other objects of the invention will be apparent from an examination of the following description and drawings, wherein:

FIG. 1 is a perspective view of a complete film editing apparatus embodying features of the invention;

FIG. 2 is a vertical section taken on line 2—2 of FIG. 1;

FIG. 3 is a horizontal section taken on line 3—3 of FIG. 1;

FIG. 4 is a vertical section taken on line 4—4 of FIG. 1; and

FIG. 5 is a vertical section taken on line 5—5 of FIG. 3.

It will be understood that, for purposes of clarity, certain elements have been eliminated from certain views where they are believed to be illustrated to better advantage in other views.

Referring now to the drawings for a better understanding of the invention, and particularly to FIG. 1, it will be seen that the film editing device of the invention is divided into a left film transportation or winding (or unwinding) station L, a right transportation station R, and an inspection station I.

To describe first the inspection station I, as best seen in FIGS. 1 and 3, the station includes a generally horizontal platform 10 on which is mounted a film cutting and splicing apparatus 12, of any suitable type, but preferably of the type described in my co-pending application for Letters Patent Ser. No. 91,417, filed Nov. 20, 1970; and entitled Film Splicing Device. Inasmuch as the film cutting and splicing apparatus is not per se related to the novel features of this invention, its construction and operation will not be described in detail herein. It is believed sufficient to say that the film splicing device employed herein is capable of cutting film or trimming jagged edges of broken film and splicing adjacent film ends together in end-to-end relationship.

Also mounted on platform 10 in front of splicing device 12 and at opposite sides of platform 10, are a pair of film guide roller brackets 14. As best seen in FIG. 4, each film guide roller bracket 14 includes a pair of rollers 16, adapted to guidably receive a strip of film F therebetween, and which are rotatably mounted on an arm 18 which in turn is pivotally mounted, as by pin 20, to a mounting ear 22 secured to platform 10.

The mounting arrangement permits the film, after it has been placed in the guide rollers in the film viewing position, as shown in FIG. 1, to be rotated back 180°, as shown in FIG. 4, to the film cutting and splicing position on the splicing device, and then rotated back 180° again to the film viewing and travel position, without ever requiring the removal of the film from the guide rollers. In order to accommodate viewing or inspection of the film there is mounted in platform 10 a translucent plate or screen 24 located directly under the film, when the film is in the viewing and travel position, and a light bulb 26 positioned under plate 24. At the front of platform 10 is located the switch panel 28 for controlling the various operations of the device.

Now to describe the film winding (unwinding) mechanisms 30, which are best illustrated in FIGS. 2, 3 and 5, it will be seen that the winding units of the left and right film transportation stations are extremely similar, so that they can be formed of a modular construction with only minor differences related to the accommodation of the direction of travel of the film. Because of this similarity, in describing the construction and operation of the units, reference will generally be made to the unit in the right hand station, but mention will be made when appropriate to the operation of the left unit which takes place at the same time. It will be understood that, as the film can be wound in either direction, each winding unit 30 is capable of the same operations as the other, but the units do not function in exactly the same manner at the same time.

Still referring to FIGS. 2, 3 and 5, it will be seen that right film winding unit 30 includes a clutch drum or hub 32, which is rotatably mounted on a vertical shaft 34, the lower end of which is journaled in or carried by a horizontally disposed mounting plate or bracket 36, which in turn is carried by the deck 38 of winding station R.

Hub 32 includes, or has secured thereto for rotation therewith, an upwardly projecting spindle 39 on which can be mounted a cartridge or reel S of motion picture film. Rotation of hub 32, and attached film reel S is effected by a variable speed motor 40 having a generally vertically disposed shaft 42 carrying a rubber pulley wheel 44 for engagement with the outer surface of hub 32 when the motor is in a hub engaging position as shown in FIG. 4.

Motor 40 is pivotally mounted at its lower end by a pin 46 to mounting ears 48, which project upwardly from deck 38, for movement toward and away from hub 32. Movement of motor 40 is effected by a motor solenoid 50 mounted on deck 38 and having extending therefrom a plunger 52 pivotally connected by pin 54 to a motor arm 56 fixed to the motor. When the motor solenoid is energized, as hereinafter described, it urges the motor in the direction of the arrow and into engagement with hub 32. When solenoid 50 is de-energized the motor is pulled out of engagement with hub 32 by the action of motor tension spring 58 which extends between motor arm 56 and the frame or housing 59.

Braking of hub 32 is effected by a braking mechanism 60 which includes a strap or band 62 generally semicircular in shape which has its free ends fixed to mounting plate 36 at opposite sides of hub 32, as at 64, and which presents, intermediate its ends, a connecting lug or ear 66.

When the brake band is in the position shown in FIG. 3 at the right the brake is not applied, but when the band is pulled to the position shown at the left in FIG. 3 the brake is applied by the functional engagement between the inside surface of the brake band and the outside surface of hub 32.

Brake band center connecting ear is pivotally connected by pin 68 to one end of a brake tension spring 70, the other end of which is connected to deck 38 by pin 72. The function of the brake spring is to bias the brake band to the active or applied position as hereinafter described.

Brake band ear 68 is also pivotally connected by pin 68 to one end of a brake lever link 74, the other end of which is pivotally connected by pin 76 to an intermediate portion of a brake lever 78. At one end brake lever 78 is pivotally connected by pin 80 to mounting plate 36, while at its other end it is pivotally connected to idler mounting pin 82. Between pins 76 and 82 brake lever 78 is also pivotally connected by pin 84 to a plunger 86 extending from a brake solenoid 88 which is mounted on deck 38 adjacent the brake mechanism. The function of brake solenoid is to urge the brake band to inactive or release position, as hereinafter described.

Now to describe the film slack take-up or idler mechanism, the operation of which is most essential to the invention. Referring to FIGS. 3 and 5, it will be seen that the film roller or slack take-up mechanism, indicated generally at 100, includes an idler lever 102 pivotally connected at one end to pin 82.

Idler lever 102 carries a pair of aligned inner and outer film roller or slack take-up rollers 104 and 106, respectively. Inner roller 104 is mounted on pin 82, or an extension thereof, and outer roller 106 is mounted on pin 108. Fixed to and carried by idler lever 102 at its inner end is a lever arm 110 one end of which is engageable with a stop 112 on the deck, to limit movement of the brake lever and idler lever in one direction, and the other end of which is engageable with a plunger 114 of a microswitch 116 also mounted on deck 38.

Idler lever 102 also carries a coil spring 118 operable to bias idler lever 102 in a clockwise direction as seen in the right side of FIG. 3. It will be understood that, as brake lever 78 and idler lever 102 are pivotally connected to each other by pin 82, when either lever is moved or urged to the right or left, the other lever will be moved or carried therewith. Further, because of the pivotal connection between the brake and idler levers, the latter is able to rotate relative to the former.

In describing the operation of the film winding and braking actions, it will be assumed that the film is being unwound from the left reel S, is travelling to the right, and is being wound on the right reel S.

After the end of the film has been manually threaded around the left pair of idler rollers, through both pair of guide rollers at the inspecting station and around the right pair of idler rollers it is attached to the reel S carried by the hub 32 of the right unit.

Rapid mechanical advancement of the film is now possible, and to begin the travel of the film to the right the right unit motor 40 and motor solenoid 50 are energized by depressing a direction switch. As the electrical switches, circuits, and controls may be of standard construction and operation they will not be discussed in detail. Since the motor is preferably a variable speed motor controlled by a three position resistor the speed selector switch must first be set to the desired speed. The controls include direction switches to control the direction of travel, but for convenience it is desirable to have a two-direction foot activated switch (not shown), so that when the operator steps on one side the film is pulled in one direction and when he steps on the other side the film is pulled in the opposite direction, and when the switch is disengaged by the operator the braking action commences as hereinafter described.

When the right direction switch is depressed right motor 40 and motor solenoid 50 are energized and the motor is moved by the solenoid into engagement with right hub 32 and begins to rotate the hub in a counterclockwise direction, as seen in FIG. 3. At the same time right brake solenoid 88 is also energized and moves right brake lever 78 to the left causing brake lever link 74 to move to the left and upward to release the right brake band from engagement with right hub 32 so that it can be freely rotated by the motor.

Motor 40 starts in a creep speed until the film is taut and as all excess slack is taken out of the film around the right idler mechanism tension on right idler rollers urges right idler lever to rotate in a counterclockwise direction bringing idler lever arm 110 into contact with plunger 114 of micro-switch 116 which causes motor 40 to go from creep speed to the pre-selected regular speed.

At the time of start-up of the right unit the brake of the left unit is, of course, still applied by the biasing action of left brake spring 70. As the film is pulled to the right, the slack is taken up and tension of the film around the idler rollers of the left unit causes the left idler lever to rotate in a clockwise direction to release the left brake mechanically, not electronically. As left idler lever rotates clockwise lever arm 110 engages stop 112 and thereby causes the inner end of the left idler lever and the lower end of brake lever 78, which are interconnected by pin 82, to move to the right. As left brake lever 78 moves to the right, left brake lever link moves to the right and up to release the brake band from the left hub 32.

At this point in the sequence the brakes of both units are released and the film is travelling to the right.

In order to stop the travel of the film the direction switch is released. This de-energizes right motor 40 and motor solenoid 50 causing the motor to stop and causing the motor solenoid to release, so the motor lever spring 58 can bias the motor away from and out of engagement with hub 32. At the same time right brake solenoid is deenergized permitting right brake spring 70 to bias the brake band into braking position. The action of the idler mechanisms of both right and left units is immaterial at this time, but they both are biased downwardly by their idler springs 118. At the same time brake spring 70 of the left unit also biases its related brake band into braking position. To start the film moving again the process is merely repeated.

In the event the film accidently breaks while travelling, to the right for example, at high speed, the brake in the left unit is automatically applied mechanically. As the tension is released from around the left idler rollers the idler spring 118 moves the left idler lever down and the left brake lever is moved to the left and the left brake spring 70 biases the left brake band into braking position. At the same time the brake in the right unit is not automatically applied but first the loss of tension on the right idler rollers permits the spring 118 to rotate the right idler lever clockwise and move the idler lever arm 110 out of contact with the microswitch plunger so that the right motor immediately goes from its pre-selected speed back to creep speed to wind the free end of the film on the right reel S. Of course, as the operator notices the break in the film he releases the direction switch and the right motor then stops and is moved away from hub 32 as the right motor solenoid is de-energized and motor lever spring 58 biases the motor away from the hub. Also, right brake spring 70 biases the right brake band into braking position.

It will be understood that when the motor is not energized it is possible to rotate the lead reel S manually to scan the film as it passes over the lighted viewing area for editing purposes.

Thus, unlike any known prior art film editing apparatus, the present invention permits fast start-up for high speed winding of film; near instant stopping for accuracy; free wheeling when not under power for manual scanning; instant braking action if film breaks; and rapid movement of film from viewing to splicing positions at the film inspection station.

I claim:

1. In an editing device for inspecting and splicing motion picture film, the combination of:
   a. a film editing station including:
      i. film viewing means;
      ii. film cutting means;
      iii. film splicing means;
   b. a pair of film transporting stations disposed at opposite sides of said film editing station for transporting said film across said film editing station.
   c. each of said film transporting stations including:
      i. film winding means;
      ii. variable speed motor means for driving said winding means at high or low speeds;
      iii. means for automatically braking said winding means in the event said motor means is deenergized or the film breaks;
      iv. film slack take-up means;
   d. means for operating said driving, braking, and takeup means in cooperation with each other for preventing:
      i. elimination of excess slack in said film;
      ii. accidental breaking of said film due to excess tensioning;
      iii. accidental unwinding of a free end of said film in the event of a pre-existing break in said film.

2. A film editing device according to claim 1, wherein said film editing station includes:
   a. guide means for receiving said film as it passes across said film editing station;
   b. means for rapidly moving said guide means with said film held therein between a position over said viewing means and a position at said cutting and splicing means.

3. A film editing device according to claim 2, wherein said film guide means include brackets mounted for rotation approximately 180° from one of said positions to the other of said positions.

4. A film editing device according to claim 1, wherein said driving means includes:
   a. a variable speed motor mounted for movement into and out of frictional engagement with said winding means;
   b. means for moving said motor into and out of frictional engagement with said winding means.

5. A film editing device according to claim 1, wherein said braking means includes:
   a. a brake band engageable with a surface presented by said winding means;
   b. spring means for normally biasing said brake band into engagement with said surface;
   c. means for moving said brake band out of engagement with said surface upon actuation of said motor means.

6. A film editing device according to claim 1, wherein said film slack take-up means includes:
   a. idler roller means engageable with said film;
   b. lever means carrying said idler roller means;
   c. means engageable with and responsive to movement of said lever means for changing the rate of speed of said driving means from a creep speed to a pre-selected higher speed when said film is tensioned about said idler means.

7. A motion picture film editing device including a film editing station, having film viewing means and film splicing means located adjacent each other, and a pair of film transporting stations disposed on opposite sides of said editing station and having means for transporting film to be edited across said editing station, each of said film transporting stations comprising:
   a. film winding means including a drum mounted for rotational movement and a film support detachably attached thereto for rotation therewith;
   b. a variable speed motor for driving said drum;
   c. motor control means operable to vary the speed of said motor between a low creep speed and a higher regular speed;
   d. brake means operable between drum engaged and drum disengaged positions;
   e. film slack take-up means including a film contact element carried on a take-up control lever;
   f. said take-up control lever being operatively engageable with said motor control means and said brake means and being pivotally mounted:
      i. for rotation in one direction, responsive to tension on the film at said film contact element, to actuate said motor control means and thereby increase the speed of said motor and also to move said brake means to disengaged position;
      ii. for rotation in the opposite direction, responsive to no tension on the film at said film contact element, to deactuate said motor control means and thereby decrease the speed of said motor and also to move said brake means to engaged position.

8. A device according to claim 7, wherein said film editing station includes:
   a. guide means for receiving said film as it passes across said film editing station;
   b. means for rapidly moving said guide means with said film held therein between one position over said viewing means and another position at said splicing means.

9. A device according to claim 8, wherein said film guide means include brackets rotatable approximately 180° from one of said positions to the other of said positions.

10. A device according to claim 7, wherein said variable speed motor is pivotally mounted for movement into and out of engagement with said drum.

11. A device according to claim 7, wherein said brake means includes:
   a. a brake band engageable with a surface presented by the drum of said winding means;
   b. spring means for normally biasing said brake band into engagement with said surface;

12. A device according to claim 7, wherein said film contact element includes at least one idler roller rotatably mounted on said take-up control lever.

* * * * *